United States Patent Office.

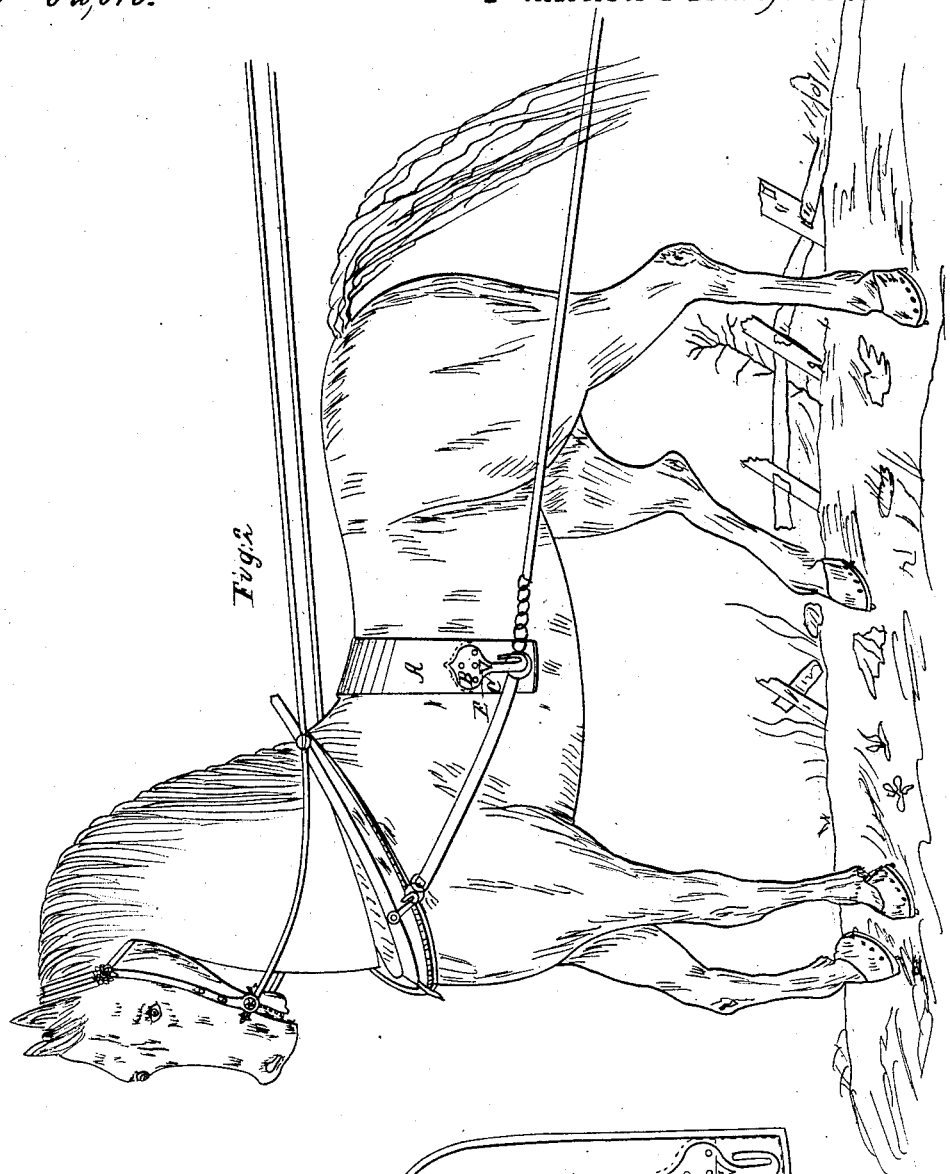

SETH WARD, OF PRINCETON, INDIANA.

Letters Patent No. 62,513, dated February 26, 1867.

IMPROVED BACK-BAND HOOK.

*The Schedule referred to in these Letters Patent and making part of the same.*

TO ALL WHOM IT MAY CONCERN:

Be it known that I, SETH WARD, of Princeton, in the county of Gibson, and State of Indiana, have invented certain new and useful improvements in Harness Hooks; and I do hereby declare that the following is a full, clear, and exact description of the same, reference being had to the accompanying drawings, and to the letters of reference marked thereon.

In the annexed drawings, A represents the back-band of a set of harness, and B the hook. This hook is provided with a flat head, through which rivets are driven to fasten it to the harness. When the stem of the hook leaves the head, it runs up at about an angle of forty-five degrees, the length the hook is desired; then curves or bends under, and runs back nearly to the hook, parallel with and lightly touching the back-band. The end of the stem, it will thus be seen, is in the same plane with the flat head. It will be observed that the leather of the back-band or back-strap to which this hook is secured acts as a keeper to prevent the escape of a trace or check-line, as the case may be. When the hook is secured to any portion of harness, it should be placed far enough from the end of the strap or band so that the said end of said strap or band will act as a keeper, as seen in the figures.

What I claim, is—

The within-described hook, formed and used with harness, substantially in the manner herein set forth, whereby the harness acts as a keeper, as described.

SETH WARD.

Witnesses:
 GEO. REED,
 JNO. B. HALL.